United States Patent
Baïna et al.

(10) Patent No.: US 7,561,601 B2
(45) Date of Patent: Jul. 14, 2009

(54) METHOD FOR SYNCHRONIZING DIGITAL SIGNALS

(75) Inventors: Jamal Baïna, Nancy (FR); Pierre Bretillon, Meylan (FR); Gabriel Goudezeune, Metz (FR); Denis Masse, Rosselange (FR)

(73) Assignee: Telediffusion de France (FR)

( * ) Notice: Subject to any disclaimer, the term of this patent is extended or adjusted under 35 U.S.C. 154(b) by 852 days.

(21) Appl. No.: 10/344,912

(22) PCT Filed: Oct. 19, 2001

(86) PCT No.: PCT/FR01/03239

§ 371 (c)(1),
(2), (4) Date: Feb. 18, 2003

(87) PCT Pub. No.: WO02/35855

PCT Pub. Date: May 2, 2002

(65) Prior Publication Data

US 2003/0179740 A1    Sep. 25, 2003

(30) Foreign Application Priority Data

Oct. 23, 2000    (FR) .................................. 00 13508

(51) Int. Cl.
*H04J 3/06*    (2006.01)
(52) U.S. Cl. ..................... 370/512; 370/503; 370/509
(58) Field of Classification Search ............... 370/503, 370/508, 509, 512, 500, 515; 348/500, 512, 348/515; 375/240.28, 355, 359
See application file for complete search history.

(56) References Cited

U.S. PATENT DOCUMENTS

| | | | | |
|---|---|---|---|---|
| 5,430,485 A | * | 7/1995 | Lankford et al. | 348/423.1 |
| 5,594,660 A | * | 1/1997 | Sung et al. | 715/500.1 |
| 5,598,352 A | * | 1/1997 | Rosenau et al. | 715/500.1 |
| 5,603,016 A | * | 2/1997 | Davies | 713/400 |
| 5,642,171 A | * | 6/1997 | Baumgartner et al. | 348/515 |
| 5,805,602 A | | 9/1998 | Curtis et al. | |
| 5,874,997 A | * | 2/1999 | Haigh | 375/240.25 |
| 6,130,987 A | * | 10/2000 | Tanaka | 386/96 |

(Continued)

FOREIGN PATENT DOCUMENTS

EP    0425834    5/1991

(Continued)

OTHER PUBLICATIONS

Annex D—Systems timing model and application implications of this recommendation/international standard (ITU-T Rec. H.222.0/ISO/IEC 13818-1)—(Jul. 1995)—p. 93-p. 102.*

*Primary Examiner*—Wing F Chan
*Assistant Examiner*—Mark A Mais
(74) *Attorney, Agent, or Firm*—Michael Best & Friedrich LLP

(57) ABSTRACT

The invention relates to a method of synchronizing first and second digital signals presenting digital elements to be put into correspondence, on the basis of time references. The method includes preliminary synchronization of the two digital signals using time references, by putting time references recognized as having the same value in the first and second digital signals into correspondence; and fine synchronization on the basis of a characteristic parameter obtained from the binary streams of the digital elements, and computed for each of the first and second digital signals.

14 Claims, 4 Drawing Sheets

U.S. PATENT DOCUMENTS

| | | |
|---|---|---|
| 6,262,776 B1 * | 7/2001 | Griffits .................. 348/512 |
| 6,351,471 B1 * | 2/2002 | Robinett et al. ............ 370/468 |
| 6,380,981 B1 * | 4/2002 | Kasezawa et al. ........... 348/515 |
| 6,429,902 B1 * | 8/2002 | Har-Chen et al. ........... 348/518 |
| 6,628,737 B1 * | 9/2003 | Timus .................... 375/368 |
| 6,765,951 B2 * | 7/2004 | Doetsch et al. ............ 375/130 |
| 6,823,302 B1 * | 11/2004 | Atkinson et al. ........... 704/216 |
| 6,950,447 B2 * | 9/2005 | Dieterich et al. ........... 370/516 |
| 7,280,156 B2 * | 10/2007 | Roelens ................... 348/512 |

FOREIGN PATENT DOCUMENTS

| | | |
|---|---|---|
| EP | 0648056 | 4/1995 |
| EP | 0683604 A2 * | 11/1995 |

\* cited by examiner

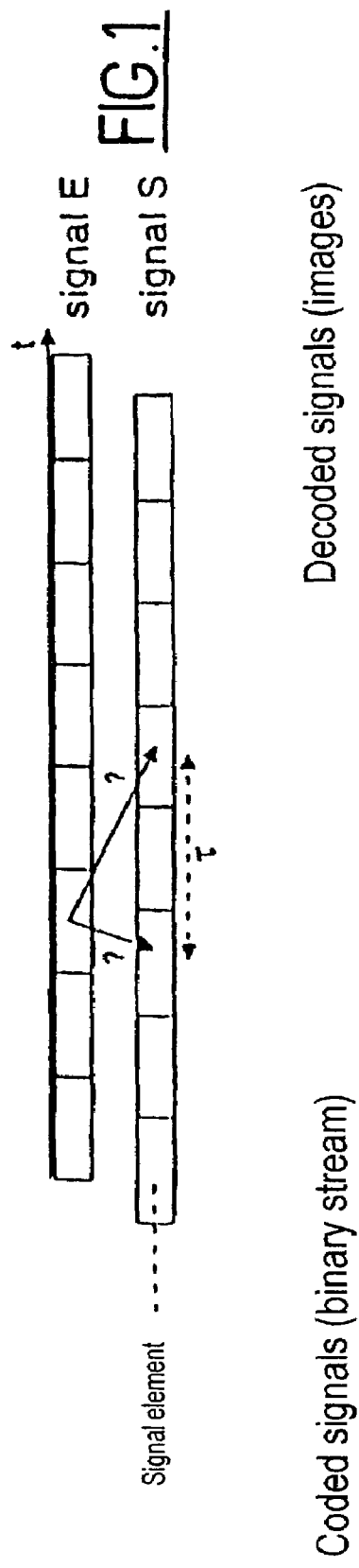
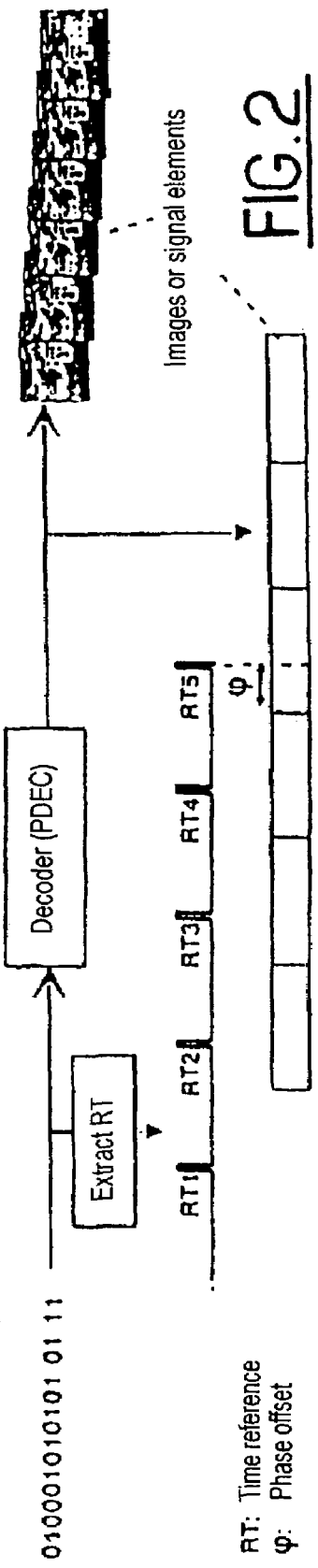
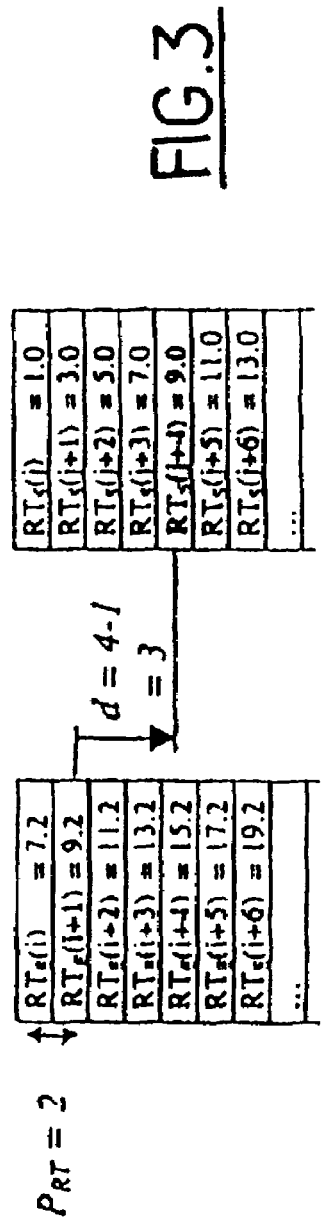

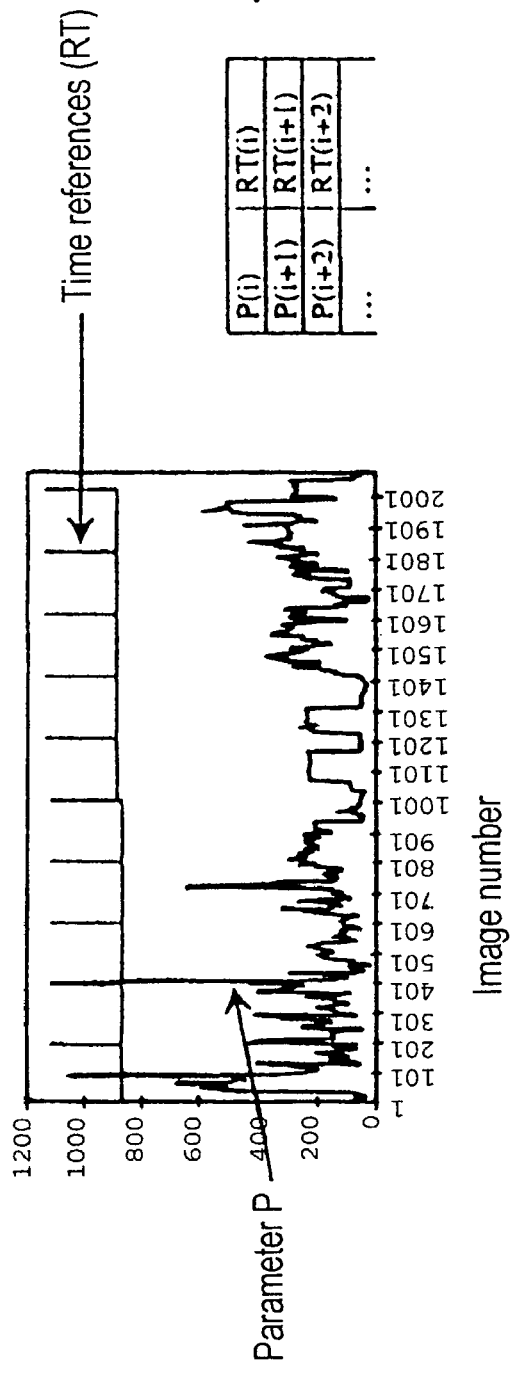
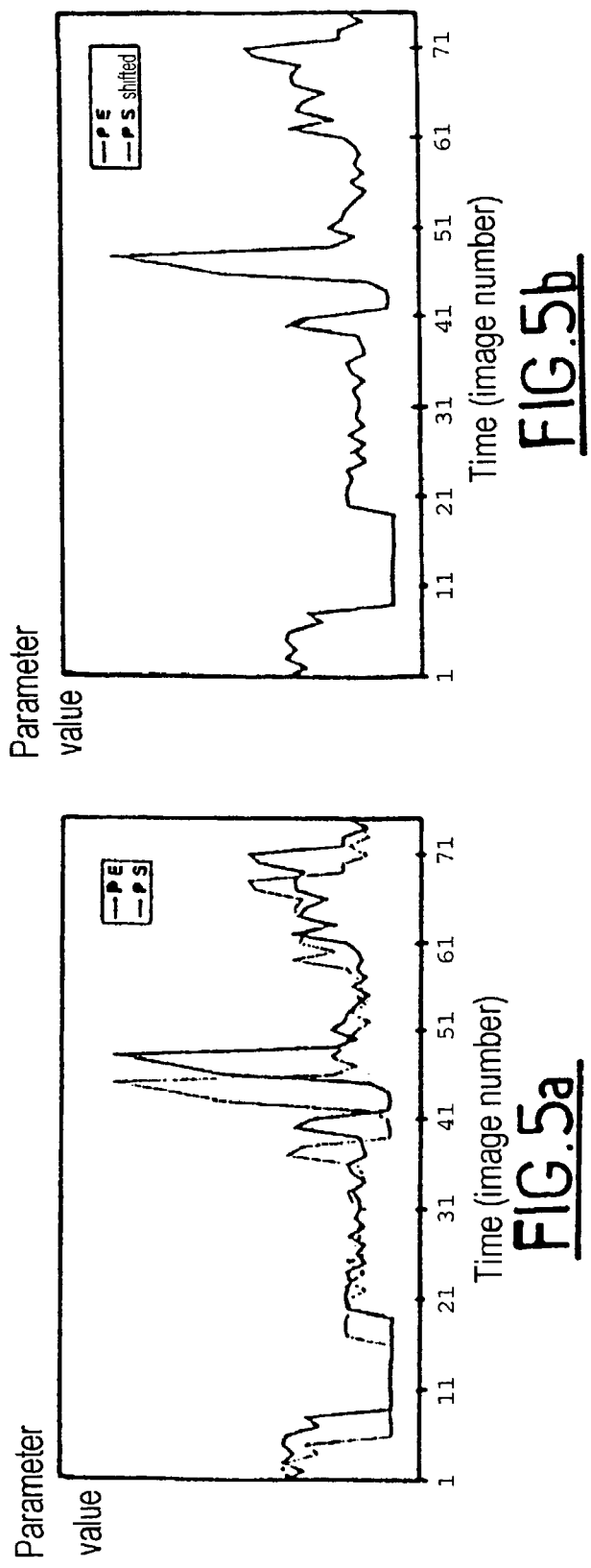

| | | | | |
|---|---|---|---|---|
| | | RT$_S$(j) = 1.0 | P$_S$(j) = Y | |
| | | RT$_S$(j+1) = 3.0 | P$_S$(j+1) = Z | |
| | | RT$_S$(j+2) = 5.0 | P$_S$(j+2) = A | |
| RT$_E$(i) = 7.2 | P$_E$(i) = A | RT$_S$(j+3) = 7.0 | P$_S$(j+3) = B | ▲ τ = -1 |
| RT$_E$(i+1) = 9.2 | P$_E$(i+1) = B | ~~RT$_S$(j+4) = 9.0~~ | ~~P$_S$(j+4) = C~~ | |
| RT$_E$(i+2) = 11.2 | P$_E$(i+2) = C | RT$_S$(j+5) = 11.0 | P$_S$(j+5) = D | |
| RT$_E$(i+3) = 13.2 | P$_E$(i+3) = D | RT$_S$(j+6) = 13.0 | P$_S$(j+6) = E | |
| RT$_E$(i+4) = 15.2 | P$_E$(i+4) = E | ... | ... | |
| RT$_E$(i+5) = 17.2 | P$_E$(i+5) = F | | | |
| RT$_E$(i+6) = 19.2 | P$_E$(i+6) = G | | | |
| ... | ... | | | |

FIG.6

| | | | |
|---|---|---|---|
| | | RT$_S$(j) = 1.0 | P$_S$(j) = Y |
| | | RT$_S$(j+1) = 3.0 | P$_S$(j+1) = Z |
| RT$_E$(i) = 7.2 | P$_E$(i) = A | RT$_S$(j+2) = 5.0 | P$_S$(j+2) = A |
| RT$_E$(i+1) = 9.2 | P$_E$(i+1) = B | RT$_S$(j+3) = 7.0 | P$_S$(j+3) = B |
| RT$_E$(i+2) = 11.2 | P$_E$(i+2) = C | RT$_S$(j+4) = 9.0 | P$_S$(j+4) = C |
| RT$_E$(i+3) = 13.2 | P$_E$(i+3) = D | RT$_S$(j+5) = 11.0 | P$_S$(j+5) = D |
| RT$_E$(i+4) = 15.2 | P$_E$(i+4) = E | RT$_S$(j+6) = 13.0 | P$_S$(j+6) = E |
| RT$_E$(i+5) = 17.2 | P$_E$(i+5) = F | ... | ... |
| RT$_E$(i+6) = 19.2 | P$_E$(i+6) = G | | |
| ... | ... | | |

FIG.7

METHOD FOR SYNCHRONIZING DIGITAL SIGNALS

The introduction of digital technology into television in particular opens up new perspectives in the field of broadcasting audiovisual signals. The use of datarate-reducing encoding techniques such as the method defined in ISO/CEI standard 13918 MPEG-2, and digital modulation techniques make it possible in particular to offer a larger number of services to the end user.

BACKGROUND OF THE INVENTION

Nevertheless, the signals restored after decoding are no longer identical to the original signals. The constraints imposed in terms of data rate or bandwidth available for transmission and the content of the signal imply that characteristic kinds of degradation appear at low data rate or under difficult transmission conditions.

In order to monitor signal quality, most measuring methods need to compare received signals (or characteristics of such signals) with transmitted signals (or with characteristics of transmitted signals). Consequently, a prior condition for monitoring quality is to be able to achieve accurate time synchronization between the signals that are to be compared.

Various methods exist for achieving for time synchronization between any two digital signals, referred to as E and S. Also such methods seek to establish correspondence between elements, i.e. portions, of said signals. For example, when synchronizing video sequences, the basic element might be one image; similarly, for an audio sequence, it could be one sample.

Existing methods can be classified in three approaches.

The most usual approach implements correlation on complete decoded signals. It consists in comparing the two signals E and S for synchronization on the basis of their respective contents. Assuming that the content of the signals varies significantly between two consecutive elements, a comparison between the signals E and S shows a high degree of similarity between the signals only when the elements thereof are in correspondence. In all other cases, the similarity that is observed is much smaller.

One example of an application of that principle to animated images consists in evaluating the variance of the error image E-S, which passes through a minimum when the images in the two video sequences are in correspondence. Alternatively, correlation between the two images is established using equation (2) below. Each pixel occupying the same spatial position (x,y) in the images of the two sequences $\Gamma(\tau)$ is at a maximum when the signals are time synchronized. The parameter $\tau$ gives the time offset for applying to one of the signals in order to obtain synchronization. An equation similar to equation (1) is applicable to audio signals.

$$\Gamma(\tau) = \sum_{t=0}^{T-1} E(t) \cdot S(t-\tau) \quad (1)$$

where T is an arbitrary duration.

$$\Gamma(\tau) = \sum_{t=0}^{T-1} \sum_{x=0}^{M-1} \sum_{y=0}^{N-1} E(x, y, t) \cdot S(x, y, t-\tau), \quad (2)$$

where (M, N) is the size of an image in E and S.

For more effective correlation, the signals E and S can initially be normalized:

$$E(t) = \frac{E(t) - \text{mean }[E(t)]}{\sqrt{\sum_{i=0}^{T-1} E^2(t)}} \quad (3)$$

where mean (E) is the average of E over the interval T.

The main drawback of that type of method is the need for content that varies significantly on a continuous basis. Depending on the type of signal being analyzed, that assumption is not always true. The content of the signals therefore has a direct influence on the performance of the method. Furthermore, the method can be difficult to implement in terms of computation power, particularly when it is applied to two video signals or to two long periods of audio signal. Furthermore, in order to use that type of approach on complete decoded signals, it is necessary for both signals E and S to be available at the same point: this is a major constraint which cannot always be satisfied in certain applications such as monitoring the quality of digital television signals in an operational system.

A second known approach uses synchronization by time references.

This second class of methods makes use of the possible presence of time references (RT) in the signals. When these time references are associated with perceptible or useful content in the signals (encoded sound or images), it is possible to make use of them when synchronizing two signals.

For this purpose, the process is based only on two series of time references RT, which are extracted from the signals using some appropriate extraction method. The time references RT can be constituted, for example, by numbers whose values increase over time, with synchronization being performed merely by selecting, for each time reference RT in a sequence, the closest time reference in the series from the other sequence.

Nevertheless, the use of reduced data rate digital systems, in particular for digital television signals, gives rise to specific problems which prevent accurate synchronization being achieved between two decoded signals in real time. The digital transmission system and the multiple pieces of equipment through which the signal passes (coder, multiplexer, transmultiplexer, decoder) lie behind this.

In a digital decoder (PDEC), an internal clock giving the rate at which decoded signal elements are output is generated on the basis of time references (RT) present in the encoded binary stream (FB). However, only the output frequency of the signals is servo-controlled on the time references, and phase is not servo-controlled. Consequently, there exists a phase offset $\phi$ between a given series of time references RT and the decoded signals (FIG. 2). The phase offset is due to the digital memories present in the decoder.

This phase offset $\phi$ is constant so long as the stream is not interrupted, but its value changes if there is a change in decoder, or in the binary stream, or even if the binary stream is merely interrupted and then taken up again. The value of the phase offset can be of an order of magnitude that is not less than the duration of the longest element in the signal. For example, when the decoded signals contain video (FIG. 2), the phase offset can be of several images.

The existence of a phase offset between the time references and the signals E and S output by datarate-reducing digital decoders has an impact on the performance of synchronization using time references. The two associated series of time references $RT_E$ and $RT_S$ are phase offset from E and S by $\phi_E$ and $\phi_S$ respectively. Furthermore, $\phi_E$ and $\phi_S$ are unknown. The two series of time references $RT_E$ and $RT_S$ are thus phase shifted by a value that is unknown, which can be of the order of several video images. Consequently, synchronizing E and S on the basis solely of time references is approximate. This approach does not enable synchronization to be obtained to within one signal element.

This approach presents the drawback of precision that is limited firstly by the precision concerning the values of the time references RT, and secondly by the need for these references to be transmitted synchronously with perceptible or useful content in the signals. Furthermore, when used with datarate-reducing digital systems, it provides coarse synchronization only. However, it is very simple to implement.

A third class of synchronization methods seeks to mitigate the need for significant and continuous variation in signal content in order to obtain good performance with correlation methods. To do this, it is possible to modify signal content so as to insert specific information therein for the purpose of optimizing correlation reliability. One possibility is to insert special patterns into the images.

That approach thus corrects a defect of correlation approaches, but it introduces signal modification, and that represents a major constraint that is incompatible with numerous applications, including monitoring the quality of digital television signals in an operational system.

OBJECTS AND SUMMARY OF THE INVENTION

The method of the invention seeks to provide accurate time synchronization while being simple to implement and without introducing any modification in the two signals that are to be modified. The main function of the method consists in evaluating the exact phase offset between the two signals. Thereafter, knowledge of this offset is used to correct the lack of synchronization.

Amongst existing approaches, the approach based exclusively on correlation is expensive to implement. Furthermore, it does not make it possible to achieve accurate synchronization (to within one image) merely on the basis of the time references present in the signals.

The idea on which the present invention is based is to define an approach constituting a hybrid between making use of time references and using an approach by correlation.

To this end, the method of the invention is organized as two distinct stages:
 a coarse synchronization stage based on the time references in the binary stream; and
 a fine synchronization stage serving to put the decoded signals into exact correspondence.

To achieve this, a simplified correlation approach is used. The method advantageously makes use of a characteristic parameter that is extracted from the signals to be synchronized, instead of using the whole signals.

The method can be integrated naturally into a system for monitoring the quality of audio and/or video digital signals, in particular for digital TV in an operational broadcast network, however it is more generally applicable whenever there is a need to achieve time synchronization between two signals.

The method of the invention can easily be integrated into a standard datarate-reducing code system for digital TV such as MPEG-2, or sound coding.

The invention thus provides a method of synchronizing first and second digital signals presenting digital content elements of the same kind that are to be put into correspondence, on the basis of time references, the method implementing:
 a) preliminary synchronization of the two digital signals using time references, by putting time references recognized as having the same value in the first and second digital signals (E, S) into correspondence; and
 b) fine synchronization on the basis of a characteristic parameter (PE, PS) obtained from the binary streams of said digital elements, and computed for each of said first and second digital signals (E, S).

Preliminary synchronization may be achieved by putting successive values of the time references of said two digital signals into best correspondence.

In the method the preliminary synchronization may implement:
 a1) selecting a time reference ($RT_E(i)$) of the first signal and a time reference ($RT_S(j)$) of the second signal and computing the difference between the values of these two time references; and
 a2) if this difference is not minimal, putting the time references ($RT_E$, $RT_S$) of the first and second signals (E, S) into correspondence by offsetting the indices (i, j) of the time references ($RT_E$, $RT_S$) of the first and second signals (E, S) by an offset (d), said offset (d) corresponding to the observed difference.

Preliminary synchronization advantageously implements determining a mean value of the difference between the values of two successive time references, which determination is preferably performed prior to a1).

In the method fine synchronization is advantageously performed:
 b1) associating a sequence of successive time references ($RT_E$, $RT_S$) of the first and second signals (E, S) with a sequence of values of a characteristic parameter of each signal, these values being written PE(i) for the value of the characteristic parameter associated with the time reference $RT_E(i)$ of the first signal (E), and PS(i) for the value of the characteristic parameter associated with the time reference $RT_S(i)$ of the second signal (S); and
 b2) comparing said sequences of values for the first and second signals (E, S) so as to put the time references [$RT_E(i)$, $RT_E(i-\tau_0)$] of the first and second signals (E, S) corresponding to similar values of said characteristic parameter.

In particular, b2) may be implemented by correlation.

BRIEF DESCRIPTION OF THE DRAWINGS

Other characteristics and advantages of the invention appear better on reading the following description, given by way of example and made with reference to the drawings, in which:

FIG. 1 illustrates the problem of synchronizing two digital signals, with FIG. 2 showing the phase offset that can arise between the time references and a signal, e.g. a video signal;

FIG. 3 shows an approximate evaluation of the offset between two signals;

FIG. 4 shows how a parameter P extracted from the content of an image sequence varies, this parameter being associated with the time references RT;

FIGS. 5a and 5b show how the parameter P varies for two signals to be synchronized, respectively before and after synchronization;

FIG. 6 shows the offset d as evaluated approximately (FIG. 3) being corrected using an additional offset $\tau$, the synchronized sequences being shown in FIG. 7 after application of the offset $\tau_0 = d + \tau$.

MORE DETAILED DESCRIPTION

Figure 8:
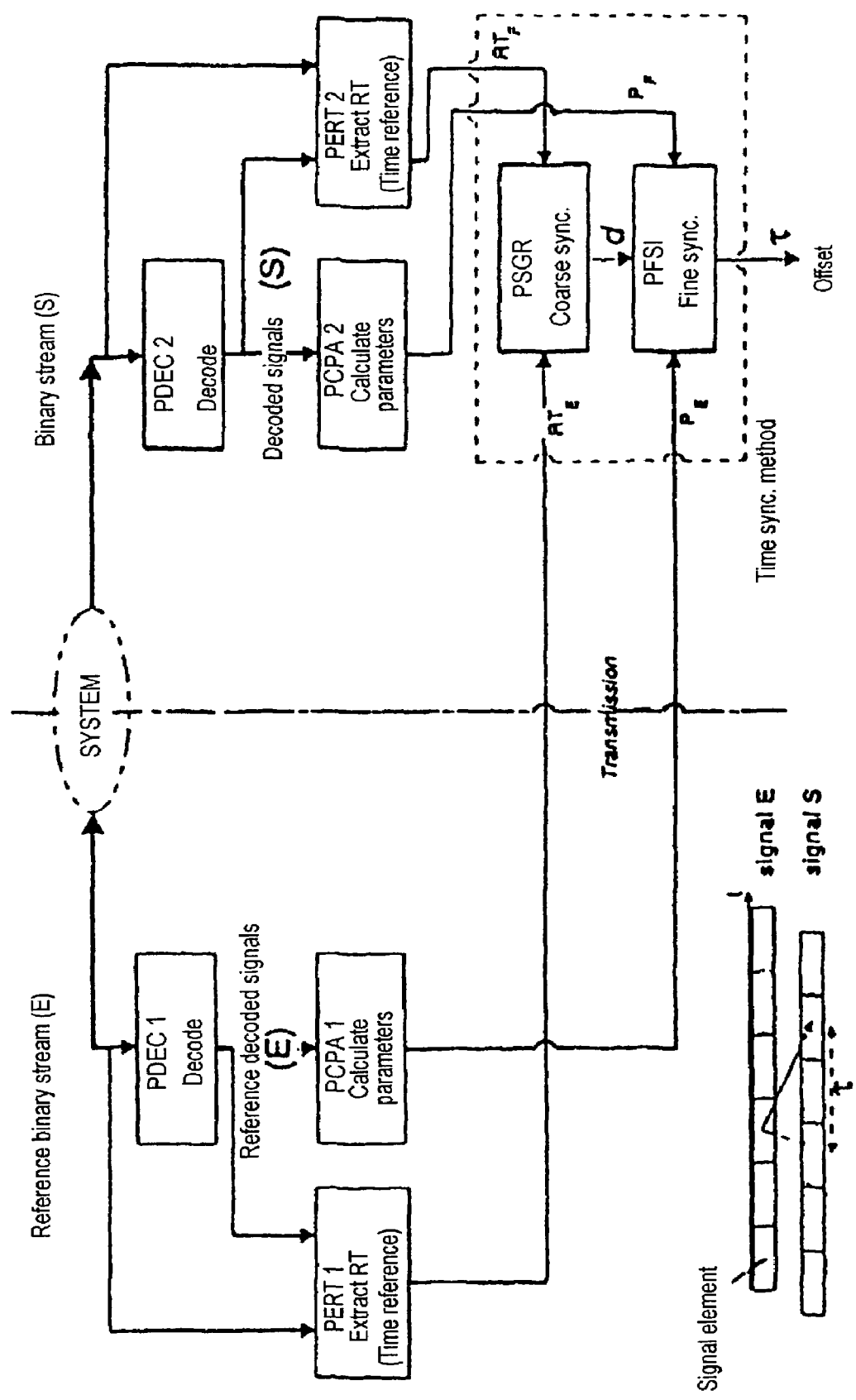
FIG. 8 shows an example of architecture for implementing the invention.

The first step of the method of the invention is preliminary synchronization making use of time references.

This first step makes use of two series of time references $RT_E$ and $RT_S$ coming from two sequences E and S respectively that are to be synchronized. It consists, for a value $RT_S(j)$ of the series $RT_S$, in seeking the closest value in the series $RT_E(i)$, and the offset to be applied to one of the series in order to synchronize them. For this purpose, two approaches are proposed:

An "exhaustive" search:

A value $RT_E(i)$ of the series $RT_E$ is selected. If the value $RT_S(j)$ of the series $RT_S$ is greater than $RT_E(i)$, then the sequence S is in advance relative to the sequence E. It is therefore necessary to retard the sequence $RT_S$ by decrementing j until this advance disappears. Conversely, if the value $RT_S(j)$ of the series $RT_S$ is smaller than $RT_E(i)$, then j is incremented.

IF $RT_S(j=1) > RT_E(i)$, then decrement j until $RT_S(j') < RT_E(i)$.
ELSE increment j until $RT_S(j') > RT_E(i)$.

A three-step predictive search:

Instead of scanning the entire list of time references and examining each of them, it is more efficient to find the looked-for time reference directly. This method is more efficient than the preceding method and it is easier to use in real time. To be able to do this, it is necessary to assume that the time references RT arrive at regular time intervals. This applies in most systems.

Thus, the first step determines the mean value $P_{RT}$ between two successive time references (assuming this value is not known). It is estimated by examining the difference between the values of two successive time references in one of the two series $RT_S(j)$ or $RT_E(i)$. This difference is not necessarily constant, because of the limited precision on the numbers $RT_S(j)$ and $RT_E(i)$, e.g. integers. Consequently, the operation is repeated over a sufficient number of differences to be able to calculate the mean difference.

The second step is proper prediction. Once the mean difference between two successive time references is known, it is possible to detect the number d of time references to be skipped in order to achieve synchronization on the basis of the difference between the values of the references $RT_S(j)$ and $RT_E(i)$.

Finally, the third step serves to predict the value of the looked-for time reference.

FIG. 3 illustrates how the offset d between the two sequences is evaluated. The method of coarse synchronization by predictive searching for the offset in three steps is summarized below:

a) the difference $P_{RT}$ between two successive time references is constant. It can be estimated on the basis of several pairs of successive time references:

$P_{RT} = \text{mean}(RT_S(j+1) - RT_S(j))$ b) In practice, for an application in real time, the values of the series $RT_S$ are in advance on those of the series $RT_E$. This gives $RT_S(j) < RT_E(i)$. The difference between the time references $RT_S(j)$ and $RT_E(i)$ of the two series makes it possible to predict the number d of $RT_E$ that needs to be received before achieving synchronization:

$d = [RT_S(j) - RT_E(i)] / P_{RT}$ c) The looked-for value $RT_E(i')$ closest to $RT_S(j)$ is:

$RT_E(i') = RT_E(i) + d \times P_{RT}$

When $RT_S(j) < RT_E(i)$, then the same procedure can be applied, with the roles of $RT_E$ and $RT_S$ being interchanged.

The difference between the values of the time references $RT_E$ and $RT_S$ is not necessarily zero. It can have a residual value less than $P_{RT}$. Under such circumstances, it is considered that the difference is minimal and that the series $RT_E$ and $RT_S$ have been put into correspondence.

At the end of this stage, the two sequences E and S that are to be synchronized can be put into correspondence. The method implements a function for correcting the indices of the time references, by adding or subtracting d to or from the indices i or j:

$i' = i + d$ or $j' = j - d$

In the example of FIG. 3, $P_{RT} = 2$ and $d = 3$.

The two sequences are now synchronized as well as possible on the basis of time references. Two effects limit the accuracy of this synchronization. Firstly, the fact that the sequences of time references $RT_E$ and $RT_S$ are not identical, and secondly the existence of a random phase offset between the signals and the time references.

The following step of fine synchronization by correlation serves to refine the result.

The second step of synchronization uses correlation to lift the uncertainties that are inherent to the preceding step.

1. In order to limit the complexity of computation, the method extracts a characteristic parameter P from each signal element. Variation in the signal is replaced by variation in the characteristic parameter P which is synchronous with the series of time references. Such a characteristic parameter can be extracted from a video sequence, for example, by any method.

FIG. 4 shows an example of how the parameter P can vary and the arrival times of the time references.

2. A correlation procedure is implemented on the parameter P so as to find exact correspondence between the two sequences. The idea is to determine whether the signal element represented by the reference $RT_S(j')$ and the parameter $P_S(j')$ correspond to the signal element represented by reference $RT_E(i)$ and the parameter $P_E(i)$, or to some other element in the vicinity T of $P_E(i)$. The purpose of the method is to provide a value for the offset $\tau$ between the two series $P_E$ and $P_S$.

The correlation method can be performed using any procedure. One possibility is to use the following equation, similar to equation (1) above, i.e.:

$$G(\tau) = 1 - \left| \sum_{0 \leq i < T} (PE(i) \cdot PS(i - \tau)) \right|$$

The parameter $P_E$ and $P_S$ may be normalized beforehand using (3).

Other possible methods are as follows:

$$-\text{Seek } G(\tau) = \min_\tau \left[ \sum_{0 \le i < T} |(P_E(i) - P_S(i-\tau)| \right] \quad (4)$$

$$-\text{Seek } G(\tau) = \min_\tau \sqrt{\frac{1}{T} \sum_{0 \le i < T} (P_E(i) - P_S(i-\tau))^2} \quad (5)$$

Correlation serves to discover a complementary offset $\tau$ between the two signals. FIGS. 5a and 6 show the existence of this offset which still appears between the series $P_E(i)$ and $P_S(j)$ after correcting the coarse offset as found in FIG. 3 between the series $RT_E(i)$ and $RT_S(j)$.

The method can then use a correction function in order to refine synchronization: the value for $\tau$ found by the correlation method is added to d so as to determine the synchronization difference $\tau_0 = d + \tau$. The correction function is then the same as for the coarse synchronization stage.

In the example of FIG. 6, $\tau = -1$ and $\tau_0 = 3 - 1 = 2$. The operation of the correlation method can be tested using the following criteria:

the signals to be correlated $P_E$ and $P_S$ are similar (similar in amplitude and waveform). For this purpose, it is verified that the preceding correlation is of good quality, using the following method:
G($\tau$)<ValidityThreshold where:

G($\tau$) being a correlation function, e.g. supplied by one of equations (1), (4), or (5); and ValidityThreshold being a validity threshold determined experimentally.

When this equation is not true, it is considered that the fine synchronization process has failed.

The signals to be correlated $P_E$ and $P_S$ vary sufficiently, i.e. they are not constant.

$$s = \frac{1}{T} \sum_{0 \le i < T} P(i) - \text{mean } [P(i)] > \text{ContentThreshold}$$

where mean [X] is the mean of X over the period T.

When this equation is not satisfied, then the fine synchronization process is considered to be impossible.

Once the additional offset correction procedure has been applied, the two sequences of FIG. 6 are exactly synchronous (FIG. 7). Each signal element corresponds to a parameter P(i), and the two signals E and S are thus synchronized (see also FIG. 5b).

An implementation of the method is given in FIG. 8. The signals E and S are obtained by decoding the corresponding binary streams in decoders PDEC1 and PDEC2. In parallel, the time references RT, respectively for E and S, are extracted by blocks PERT1 and PERT2. These time references are made use of by the coarse synchronization processor PSGR which supplies the offset d that exists between the two sequences as obtained using the above-described procedure. Thereafter, the decoded signals E and S are used to enable an external auxiliary method to extract the characteristic parameters therefrom in blocks PCPA1 and PCPA2. This information is used for achieving fine synchronization, which is performed by a processor PSFI. The exact offset that exists between the elements of the signals E and S, in this case image sequences, is given by $\tau_0 = d + \tau$.

The method proposed by the invention is very useful in application to a digital television broadcast network. In such a context, it is generally not possible to have both sequences E and S present at the same location. Consequently, it is not possible to use a conventional correlation approach. The advantage of the system proposed comes from using characteristic parameters of the signals, which parameters are represented by numbers that are easily transported, in order to achieve fine synchronization.

Example of operation

The table below illustrates how the method operates when the difference between two successive time references RT is constant, so the value of the time reference $RT_E$ is transmitted only once every N parameters PE. In this case N=15. Coarse synchronization based on the time references have been performed: after compensating for the offset d existing between the two series of values, it can be seen that the values of the two series are similar. Thereafter, the parameters P corresponding to the time references are used to perform fine synchronization. The table below shows that under such circumstances, there exists an additional offset of $\tau=1$ signal element.

Parameter Variation after Coarse Synchronization

| Parameter variation after coarse synchronization | | | |
| --- | --- | --- | --- |
| Input time ($RT_E$) | Output time ($RT_S$) | Parameter $P_E$ | Parameter $P_S$ |
| 10329576 | 10329619 | 230.5625 | 170.8125 |
| 10329576 | 10329619 | 170.875 | 218.9375 |
| 10329745 | 10329788 | 218.5625 | 200.0625 |
| 10329745 | 10329788 | 200.125 | 203.9375 |
| 10329745 | 10329788 | 204.125 | 222.375 |
| 10329745 | 10329788 | 222.3125 | 216.75 |
| 10329745 | 10329788 | 216.875 | 221.9375 |
| 10329745 | 10329788 | 222.1875 | 248.3125 |
| 10329745 | 10329788 | 248.375 | 276 |
| 10329745 | 10329788 | 276.0625 | 479.6875 |
| 10329745 | 10329788 | 479.625 | 715.6875 |
| 10329745 | 10329788 | 715.5625 | 875.25 |
| 10329745 | 10329788 | 875.125 | 862.9375 |
| 10329745 | 10329788 | 863.125 | 976.8125 |
| 10329745 | 10329788 | 976.8125 | 873.8125 |
| 10329745 | 10329788 | 873.4375 | 825.6875 |
| 10329745 | 10329788 | 825.4375 | 814.0625 |
| 10329914 | 10329957 | 813.9375 | 851.0625 |
| 10329914 | 10329957 | 851.375 | 882.375 |

The method proposed is relatively simple to implement and it can find multiple applications in the field of digital TV:

firstly, there are applications for monitoring signal quality in a network. Because of their very great extent, such networks are particularly suitable for use of the invention;

testing laboratory equipment by performing quality measurements constitutes another application, where the advantage of the invention comes from the ease with which it can be implemented; and finally the proposed method can be applied to resynchronizing signals before and after passing through certain particular pieces of equipment, for example encoders and/or transcoders in cascade.

More generally, the invention applies to any digital system since the occurrence of phase offsets is a characteristic of such systems.

An advantage of the method of the invention is that there is no need to have the complete signal E available in order to synchronize a received digital signal S with the signal E, e.g. for the purpose of evaluating quality. It suffices to have the time references $RT_E$ of the reference signal available, together with the corresponding values of the parameter P. Under such conditions, it is possible to compute the parameter P for each digital element, e.g. for each image, in the received signal S so as to make it possible subsequently to achieve the desired synchronization. The time references $RT_E$ and the corresponding parameters P of the reference signal E can be transmitted, for example, using a service channel incorporated in the digital transmission medium, without any need to modify the transmitted signal.

For example, with images, the invention makes it possible to match the images of the reference signal E with the images of a degraded signal S by using parameters representative of image quality. The image quality of the signal S can become degraded by random effects in transmission and/or by the presence of encoders or of decoders in the transmission system. Quality evaluation can then be performed by comparing parameters representative of the quality of the images in the reference signal E and in the degraded signal S.

In general manner, the characteristic parameter P can be any magnitude that is obtained from the content of the digital signals, and by way of example, in video:
the brightness of the image or of a zone thereof such as that given by the DC coefficient F(0,0) of the discrete cosine transform (DCT) of the image, or any linear or orthogonal block transform or block or global transform;
contrast in the image or in a zone thereof, e.g. as given by applying a Sobel filter;
image activity SA as defined, for example, in PCT application WO 99/18736 in the name of the Applicant, and obtained by a linear and orthogonal block transform (TCD, Fourier, Haar, Hadamard, Slant, wavelets, etc. transform, . . . ); and
the mean of the image;
and in audio:
power; or
power spectrum density as defined in French patent application No. FR 2 769 777 filed on Oct. 13, 1997.

It should be observed that the parameter P can be itself subjected to degradation due to transmission, but in practice it is found that given the level of degradation that is generally to be observed in a transmission network, synchronization can be performed using the method of the invention.

In general, once synchronization has been acquired, the method makes it possible to verify that it is properly conserved, so as to be able to remedy synchronization wherever necessary due to disturbances such as an interruption in the binary stream, a change of binary stream, a change of decoder, etc. . . . , by resynchronizing the digital signals E and S.

The invention claimed is:

1. A method of synchronizing a first reference digital signal and a second test digital signal that is derived from the first reference digital signal, each having time references, the method comprising:
  extracting a plurality of time references for the first reference digital signal and the second test digital signal, the first reference digital signal and the second test digital signal including the same initial content;
  preliminarily synchronizing the first reference digital signal and the second test digital signal based on the extracted time references;
  determining a first offset between the first reference digital signal and the second test digital signal based on a difference between corresponding time references for the first digital signal and the second test digital signal; and
  further synchronizing the first reference digital signal and the second test digital signal by
    extracting a plurality of characteristic parameters associated with the extracted plurality of time references from the first reference digital signal and the second test digital signal,
    determining a second offset between the characteristic parameters of the first reference digital signal and the second test digital signal, and
    applying the first offset and the second offset to the first digital signal to synchronize one of audio elements and video elements of the first reference digital signal and the second test digital signal.

2. A method according to claim 1, wherein preliminary synchronization is performed by putting successive values of the time references of said two digital signals into correspondence.

3. A method according to claim 2, wherein preliminary synchronization implements:
  a1) selecting a time reference of the first signal and a time reference of the second signal and computing the difference between the values of these two time references; and
  a2) if this difference is not minimal, putting the time references of the first and second signals into correspondence by offsetting the indices of the time references of the first and second signals by an offset, said offset corresponding to the observed difference.

4. A method according to claim 3, the method being implemented for at least one of the first and second signals by determining a mean value for the difference between the values of two successive time references.

5. A method according to claim 4, wherein said determination of said mean value is performed before a1).

6. A method of synchronizing a first reference and a second test digital signal deriving from the first reference digital signal and presenting digital elements of the same kind representing a same initial content that are to be put into correspondence, on the basis of time references, the method implementing:
  a) preliminary synchronization of the two digital signals using time references, wherein time reference $RT_E(i)$ is a time reference associated with the first signal and time reference $RT_S(i)$ is a time reference associated with the second digital signal, wherein the preliminary synchronization includes putting time references recognized as having the same value in the first and second digital signals into correspondence by offsetting the indices of the time references by an offset value d, so that the difference between the values of the time references is less than the value between two successive time references; and
  b) fine synchronization of the two digital signals on the basis of a sequence of characteristic parameters obtained from binary streams of said digital elements, and computed for each of said first reference signal and second test digital signal, wherein fine synchronization is performed by:
    b1) associating a sequence of successive time references of the first and second signals with a sequence of values of the characteristic parameter of each signal, wherein $P_E(i)$ represents a value of a characteristic parameter associated with the time reference $RT_E(i)$ of the first signal, and $P_S(i)$ represents a value of a characteristic parameter associated with the time reference $RT_S(i)$ of the second signal; and b2) comparing said sequences of values of the characteristic parameter for the first and second signals so as to select the time references $[RT_E(i), RT_S(i-\tau_0)]$ of the first and second signals corresponding to characteristic parameters $P_E(i)$ and $P_S(i)$ having similar values, wherein $\tau_0$ represents the sum of d and $\tau$, and $\tau$ represents a complementary offset between the characteristic parameters $P_E(i)$ and $P_S(i)$ having similar values after the preliminary synchronization.

7. A method according to claim 6, wherein b2) is performed by correlation.

8. A method according to claim 6, wherein further synchronization is taken into account only when the characteristic parameters in each sequence of values vary sufficiently, wherein the characteristic parameters vary sufficiently if:

$$\frac{1}{T}\sum_{0\leq i<T}|P(i)-\text{mean }[P(i)]|>SC$$

and wherein:

SC designates a content threshold;

$P(i)$ represents either the value $P_E(i)$ for the first digital signal or the value $P_S(i)$ for the second digital signal:

mean $[P(i)]$ designates the mean value of the parameter $P(i)$ in the range $0\leq i<T$; and T is a chosen period.

9. A method according to claim 6, wherein further synchronization is performed only when the signals to be correlated are close, wherein the first and second digital signals are close if a correlation function $G(\tau)$ is less than a validity threshold, and wherein $$G(\tau)=\min_{\tau}\left[\sum_{0\leq i<T}|P_E(i)-P_S(i-\tau)|\right]$$

where T designates a number of values in the sequence of values.

10. A method according to claim 6, wherein further synchronization is performed only when the signals to be correlated are close, wherein the first and second digital signals are close if a correlation function $G(\tau)$ is less than a validity threshold, and wherein $$G(\tau)=\min_{\tau}\left[\sum_{0\leq i<T}|P_E(i)-P_S(i-\tau)|\right]$$

where T designates a number of values in the sequence of values.

11. A method according to claim 7, wherein the correlation is performed by seeking the minimum $\tau_0$, as a function of $\tau$ for the function:

$$\sum_{0\leq i<T}|(P_E(i)-P_S(i-\tau)|$$

where T designates a number of values in the sequence of values.

12. A method according to claim 7, wherein the correlation is performed by seeking the minimum $\tau_0$, as a function of $\tau$ in the function:

$$\sqrt{\frac{1}{T}\sum_{0\leq i<T}(P_E(i)-P_S(i-\tau))^2}$$

where T designates a number of values in the sequence of values.

13. A method according to claim 7, wherein the correlation is performed by seeking the maximum $\tau_0$, as a function of $\tau$ in the function:

$$\sum_{i=0}^{T-1}(P_E(t)\cdot P_S(i-\tau))$$

where T designates a number of values in the sequence of values.

14. A method of synchronizing a first digital signal and a second digital signal, the method comprising:

extracting a plurality of time references for the first digital signal and the second digital signal, the first digital signal including audio elements and video elements and the second digital signal including audio elements and video elements;

determining a mean value between two successive time references in one of the first digital signal and the second digital signal;

determining a first offset between the first digital signal and the second digital signal based on the average value;

extracting a plurality of characteristic parameters associated with the extracted plurality of time references from the first digital signal and the second digital signal;

determining a second offset between the characteristic parameters of the first digital signal and the second digital signal; and applying the first offset and the second offset to the first digital signal to synchronize the audio elements of the first digital signal and the audio elements of the second digital signal and the video elements of the first digital signal and the video elements of the second digital signal.

* * * * *